US012562793B2

(12) United States Patent
Liu et al.

(10) Patent No.: US 12,562,793 B2
(45) Date of Patent: Feb. 24, 2026

(54) JOINT CSI FEEDBACK FOR MULTI-TRP BASED DL TRANSMISSION

(71) Applicant: LENOVO (BEIJING) LIMITED, Beijing (CN)

(72) Inventors: Bingchao Liu, Beijing (CN); Chenxi Zhu, Fairfax, VA (US); Wei Ling, Beijing (CN); Yi Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 529 days.

(21) Appl. No.: 18/015,402

(22) PCT Filed: Jul. 10, 2020

(86) PCT No.: PCT/CN2020/101288
§ 371 (c)(1),
(2) Date: Jan. 10, 2023

(87) PCT Pub. No.: WO2022/006841
PCT Pub. Date: Jan. 13, 2022

(65) Prior Publication Data
US 2023/0262503 A1     Aug. 17, 2023

(51) Int. Cl.
*H04B 7/06*     (2006.01)
*H04B 7/022*     (2017.01)
*H04W 24/10*     (2009.01)

(52) U.S. Cl.
CPC ........... *H04B 7/0626* (2013.01); *H04B 7/022* (2013.01); *H04W 24/10* (2013.01)

(58) Field of Classification Search
CPC ..... H04W 24/10; H04B 7/022; H04B 7/0626; H04B 7/024; H04B 7/0639; H04B 7/0481; H04L 5/005; H04L 5/0057; H04L 5/0035
See application file for complete search history.

(56) References Cited

U.S. PATENT DOCUMENTS

| | | | | |
|---|---|---|---|---|
| 2017/0244533 A1* | 8/2017 | Onggosanusi | ....... | H04B 7/0481 |
| 2018/0042028 A1 | 2/2018 | Nam et al. | | |
| 2018/0351621 A1* | 12/2018 | Wei | ........................ | H04W 24/10 |
| 2020/0244320 A1* | 7/2020 | Wang | ................... | H04B 7/0639 |

(Continued)

FOREIGN PATENT DOCUMENTS

| | | |
|---|---|---|
| EP | 3276851 A1 | 1/2018 |
| WO | 2019029461 A1 | 2/2019 |

OTHER PUBLICATIONS

Spreadtrum Communications, "Discussion on Multi-TRP transmission", 3GPP TSG RAN WG1 #99 R1-1912562, Nov. 18-22, 2019, pp. 1-10 (Year: 2019).*

(Continued)

*Primary Examiner* — Ayaz R Sheikh
*Assistant Examiner* — Louis Samara
(74) *Attorney, Agent, or Firm* — Kunzler Needham & Hilton

(57) ABSTRACT
Methods and apparatuses for jointly reporting CSI in multi-TRP based DL transmission are disclosed. In one embodiment, a method comprises transmitting a CSI reporting setting linked to two or more Resource Settings for channel measurement, wherein the two or more Resource Settings for channel measurement have the same number of CSI-RS resources, and receiving a joint CSI report corresponding to the CSI reporting setting.

20 Claims, 5 Drawing Sheets

(56) References Cited

U.S. PATENT DOCUMENTS

| | | | |
|---|---|---|---|
| 2021/0234662 A1* | 7/2021 | Qi | H04L 5/0035 |
| 2022/0020668 A1* | 1/2022 | Kawai | H10D 62/115 |
| 2022/0200668 A1* | 6/2022 | Wang | H04B 7/024 |
| 2022/0271817 A1* | 8/2022 | Lee | H04B 17/318 |
| 2024/0291539 A1* | 8/2024 | Song | H04B 7/063 |

OTHER PUBLICATIONS

Huawei, Hisilicon, CSI measurement enhancement for multi-TRP/ panel transmission, 3GPP TSG RAN WG1 Meeting #97, R1-1906038, May 13-17, 2019, pp. 1-4, Reno, USA. (Year: 2019).*
H. Elgendi, M. Mäenpää, T. Levanen, T. Ihalainen, S. Nielsen and M. Valkama, "Interference Measurement Methods in 5G NR: Principles and Performance," 2019 16th International Symposium on Wireless Communication Systems (ISWCS), Oulu, Finland, 2019, pp. 233-238, doi: 10.1109/ISWCS.2019.8877215. (Year: 2019).*
Spreadtrum Communications, "Discussion on Multi-TRP transmission", 3GPP TSG RAN WG1 #99 R1-1912562, Nov. 18-22, 2019, pp. 1-10.
International Searching Authority, "Written Opinion of the International Searching Authority," PCT/CN2019/101288, Apr. 6, 2021, pp. 1-3.
Huawei, Hisilicon, CSI measurement enhancement for multi-TRP/ panel transmission, 3GPP TSG RAN WG1 Meeting #96bis, R1-1903982, Apr. 8-12, 2019, pp. 1-6, Xi'an, China.
Huawei, Hisilicon, CSI measurement enhancement for multi-TRP/ panel transmission, 3GPP TSG RAN WG1 Meeting #97, R1-1906038, May 13-17, 2019, pp. 1-4, Reno, USA.

* cited by examiner

300

Start

302 receiving a CSI reporting setting linked to two Resource Settings for channel measurement, wherein the two Resource Settings for channel measurement have the same number of CSI-RS resources

304 transmitting a joint CSI report corresponding to the CSI reporting setting

End

400

Start

402 transmitting a CSI reporting setting linked to two or more Resource Settings for channel measurement, wherein the two or more Resource Settings for channel measurement have the same number of CSI-RS resources

404 receiving a joint CSI report corresponding to the CSI reporting setting

End

JOINT CSI FEEDBACK FOR MULTI-TRP BASED DL TRANSMISSION

FIELD

The subject matter disclosed herein generally relates to wireless communications, and more particularly relates to methods and apparatuses for jointly reporting CSI for multi-TRP based DL transmission.

BACKGROUND

The following abbreviations are herewith defined, at least some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Orthogonal Frequency Division Multiplexing (OFDM), Radio Resource Control (RRC), Time-Division Duplex (TDD), Time Division Multiplex (TDM), User Entity/Equipment (Mobile Terminal) (UE), Uplink (UL), Universal Mobile Telecommunications System (UMTS), Physical Downlink Shared Channel (PDSCH), Physical Uplink Shared Channel (PUSCH), Physical Uplink Control Channel (PUCCH), Downlink control information (DCI), Single-DCI (S-DCI), transmission reception point (TRP), multiple TRP (multi-TRP or M-TRP), Quasi Co-Location (QCL), channel state information (CSI), channel state information reference signal (CSI-RS), Transmission Configuration Indication (TCI), reference signal (RS), Media Access Control (MAC), Control Element (CE), Demodulation Reference Signal (DM-RS), non-coherent joint transmission (NCJT), frequency range (FR), CSI-RS resource indicator (CRI), rank indicator (RI), precoding matrix indicator (PMI), layer indicator (LI), channel quality indicator (CQI), Non-Zero Power (NZP), Information Element (IE).

In NR Release 15, the CSI feedback framework is designed for single-TRP scenario. Channel state information reference signal (CSI-RS) is used for measuring DL channels. UE receives CSI-RS resources to perform DL channel measurement and may report the result of the measurement to gNB (the base station). A CSI-ReportConfig IE configured by RRC signaling is a CSI reporting setting to notify the UE the quantities (parameters) to be reported, the resources to be measured and the reporting manner.

In NR Release 15, a CSI-ReportConfig is linked to one Resource Setting for channel measurement which may have multiple resource sets each of which may include one or more CSI-RS resources. One or more CSI-RS resource sets selected from the Resource Setting are linked with one CSI-ReportConfig. From the UE point of view, the CSI-RS resources included in the linked CSI-RS resource set(s) are to be received by the UE for the channel measurement. For example, an aperiodic CSI reporting is triggered by a DCI, and in particular, a non-zero 'CSI request' field of the DCI. Each CSI request field value, which is referred to as a trigger state, is associated with one or more CSI-ReportConfig configured by a higher layer parameter CSI-AperiodicTriggerState.

A higher layer parameter reportQuantity contained in CSI-ReportConfig IE configures the UE with the CSI quantities (parameters) to be reported. The parameters may include but not limited to CSI-RS resource indicator (CRI), rank indicator (RI), precoding matrix indicator (PMI), layer indicator (LI) and channel quality indicator (CQI).

CRI is used to indicate a CSI-RS resource to derive the corresponding CSI parameter(s). That is, CRI is used to indicate one CSI-RS resource from the CSI-RS resources included in the linked CSI-RS resource set(s) in the Resource Setting.

RI is used to indicate the maximum number of DL layers that can be supported for the received CSI-RS resource indicated by CRI.

PMI is used to indicate the best precoding matrix suitable for the received CSI-RS resource indicated by CRI.

LI indicates which column of the precoder matrix of the reported PMI corresponds to the strongest layer of the codeword corresponding to the largest reported wideband CQI. If two wideband CQIs are reported and have equal value, the LI corresponds to strongest layer of the first codeword.

CQI is used to indicate how good or bad the communication channel quality is.

Single-DCI (S-DCI) based multi-TRP DL transmission is supported in NR Release 16. A DCI can schedule a PDSCH transmission transmitted from two TRPs using two different beams in FR2, where each TRP transmits partial layers of the PDSCH transmission. It means that a UE can receive a PDSCH transmission simultaneously transmitted from two TRPs with two different beams in FR2.

According to NR Release 16 CSI feedback framework, the CSI-RS resources for channel measurement cannot be simultaneously transmitted with different beams to a UE. In addition, the inter-TRP coordination (e.g. the coordination between two TRPs) can only be treated as an interference measured based NZP CSI-RS resources with determined layers. In this condition, the reported CSI cannot well match the non-coherent joint PDSCH transmission by different TRPs.

Although multiple separate CSI reports for different TRPs can be achieved by triggering different CSI reporting settings, unnecessary measurement latency would be caused. Furthermore, the reported CSI parameters, such as RI and PMI, may not be the optimal CSI for the joint transmission because the inter-TRP 'interference' is not well considered in separately reported CSIs.

This invention discloses methods and apparatuses for jointly reporting CSI for multi-TRP based DL transmission.

BRIEF SUMMARY

Methods and apparatuses for jointly reporting CSI for multi-TRP based DL transmission are disclosed.

In one embodiment, a method comprises transmitting a CSI reporting setting linked to two or more Resource Settings for channel measurement, wherein the two or more Resource Settings for channel measurement have the same number of CSI-RS resources, and receiving a joint CSI report corresponding to the CSI reporting setting.

In one embodiment, the two Resource Settings for channel measurement includes a first Resource Setting and a second Resource Setting, each CSI-RS resource in the first Resource Setting is associated with a CSI-RS resource in the second Resource Setting. The joint CSI report includes one index CRI k (k>=0), wherein the CRI k corresponds to the configured $(k+1)^{th}$ CSI-RS resource in the first Resource Setting and the configured $(k+1)^{th}$ CSI-RS resource in the second Resource Setting.

In another embodiment, the joint CSI report includes a joint RI, wherein each value of the joint RI indicates RIs conducted by the CSI-RS resources indicated by reported CRI. The sum of the RIs is smaller than or equal to a value indicated by a configured RI restriction in the CSI reporting setting. The joint CSI report may include two or more LIs, a first LI indicates which column of a precoder matrix of a first reported PMI corresponds to the strongest layer and a second LI indicates which column of a precoder matrix of a second reported PMI corresponds to the strongest layer If the transmission of CSI-RS resources is aperiodic, the CSI-RS resources within the two or more Resource Settings are configured with the same triggering offset.

In another embodiment, a remote unit comprises a receiver that receives a CSI reporting setting linked to two Resource Settings for channel measurement, wherein the two Resource Settings for channel measurement have the same number of CSI-RS resources, and a transmitter that transmits a joint CSI report corresponding to the CSI reporting setting.

In one embodiment, a method comprises receiving a CSI reporting setting linked to two Resource Settings for channel measurement, wherein the two Resource Settings for channel measurement have the same number of CSI-RS resources, and transmitting a joint CSI report corresponding to the CSI reporting setting.

In yet another embodiment, a base unit comprises a transmitter that transmits a CSI reporting setting linked to two or more Resource Settings for channel measurement, wherein the two or more Resource Settings for channel measurement have the same number of CSI-RS resources, and a receiver that receives a joint CSI report corresponding to the CSI reporting setting.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
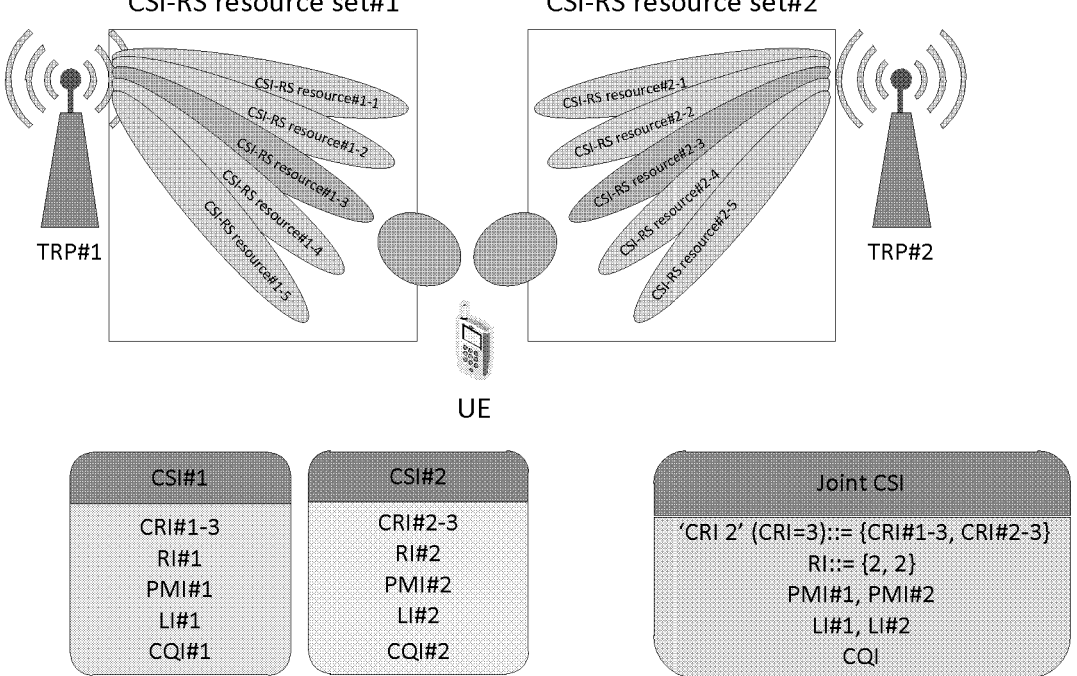
FIG. 1 illustrates a joint CSI reporting.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

A UE may have the capability of simultaneous DL reception with different 'QCL-TypeD's in FR2. That is to say, in a multi-TRP (e.g. two TRPs) scenario where a UE is served by multiple TRPs, the UE may receive DL signals simultaneous from multiple TRPs with different spatial Rx parameters in FR2.

Traditionally, one CSI-ReportConfig can be linked to only one Resource Setting for channel measurement that is related to one TRP. In particular, a triggering state (i.e. a non-zero CSI request field value) (suppose that the triggering state is associated with one CSI-ReportConfig) is associated with one or multiple CSI-RS resource sets in the one Resource Setting. In other words, one CSI-ReportConfig can only be used to configure the UE to report CSI parameters for one TRP. If CSI parameters for multiple TRPs (e.g. two TRPs) are to be reported, multiple (e.g. two) different CSI-ReportConfig should be triggered to the UE.

According to the present disclosure, two Resource Settings for channel measurement (e.g. a first Resource Setting for channel measurement (maybe abbreviated as "first Resource Setting") and a second Resource Setting for channel measurement (maybe abbreviated as "second Resource Setting")) can be configured for a UE for one CSI reporting setting 'CSI-ReportConfig', where the UE has the capability of simultaneous reception with different 'QCL-TypeD's in FR2. That is, one CSI reporting setting 'CSI-ReportConfig' is linked to two Resource Settings for channel measurement (i.e. first Resource Setting and second Resource Setting). Each of the first Resource Setting and the second Resource Setting has the same number of CSI-RS resources. Each CSI-RS resource in the first Resource Setting has an associated CSI-RS resource in the second Resource setting, which means that, in multi-TRP (e.g. two TRPs) scenario, the associated two CSI-RS resources are transmitted simultaneously from the two TRPs respectively. In each of the first Resource Setting and the second Resource Setting, the same number of resource sets is configured. For example, N (N>0) first resource sets are configured in the first Resource Setting; while the same number of N second resource sets are configured in the second Resource Setting. Each of the first resource sets in the first Resource Setting has its associated second resource set in the second Resource Setting. A first resource set being associated with a second resource set means that (1) the number of CSI-RS resources in the first resource set is equal to the number of CSI-RS resources in its associated second resource set, and (2) each CSI-RS resource in the first resource set is one-by-one associated with a CSI-RS resource in its associated second resource set based on the same ordering of the CSI-RS resources in each of the first resource set and its associated second resource set.

For example, the first Resource Setting includes N first resource sets, and the second Resource Setting includes the same number of N second resource sets. The $n^{th}$ (n=1 to N) first resource set in the first Resource Setting is associated with the same $n^{th}$ second resource set in the second Resource Setting. In addition, each of the CSI-RS resource(s) in the $n^{th}$ first resource set is one-by-one associated with a CSI-RS resource in the associated $n^{th}$ second resource set based on the same ordering.

For aperiodic CSI report, the triggering state associated with one CSI reporting setting 'CSI-ReportConfig' is linked with two Resource Settings for channel measurement. In particular, the triggering state associated with one CSI reporting setting 'CSI-ReportConfig' is linked with one or multiple resource set(s) (first resource set(s)) in the first Resource Setting and associated one or multiple resource set(s) (associated second resource set(s)) in the second Resource Setting.

Each of the first resource sets and its associated second resource set includes the same number of CSI-RS resources. In addition, the CSI-RS resources contained in each of the first resource sets and the CSI-RS resources contained in its associated second resource set are one-by-one associated based on the ordering. For example, the triggering state associated with one CSI reporting setting 'CSI-ReportConfig' is linked with M (M>0) first resource sets and their associated M second resource sets. As the CSI-RS resources contained in each of the first resource sets and the CSI-RS resources contained in the associated second resource set have the same number and are associated with each other, the CSI-RS resources in all of the first resource sets linked with one CSI reporting setting 'CSI-ReportConfig' and the CSI-RS resources contained in all of the associated second resource sets linked to the same one CSI reporting setting 'CSI-ReportConfig' have the same number and are associated with each other.

From the UE point of view, when one CSI reporting setting 'CSI-ReportConfig' is linked with one or multiple first resource set(s) in the first Resource Setting and associated same number of second resource set(s) in the second Resource Setting, the UE would be configured with one or more CSI-RS resources in all of the first resource sets and the same number of CSI-RS resources in all of the associated second resource sets. In addition, the one or more CSI-RS resources in the all of the first resource sets are one-by-one associated with the same number of CSI-RS resources in all of the associated second resource sets. Therefore, for simplicity, the one or more CSI-RS resources in all of the first resource sets in the first Resource Setting linked with one CSI reporting setting 'CSI-ReportConfig' can be referred to as CSI-RS resources of "first resource set" while the same number of CSI-RS resources in all of the second resource sets in the second Resource Setting linked with the one CSI reporting setting 'CSI-ReportConfig' can be referred to as CSI-RS resources of "second resource set". Needless to say, the CSI-RS resources of "first resource set" are one-by-one associated with the CSI-RS resources of "second resource set" based on the same ordering.

An example is illustrated in FIG. 1. CSI-RS resource set #1 (the first resource set) containing 5 CSI-RS resources in the first Resource Setting is linked with one 'CSI-ReportConfig'; CSI-RS resource set #2 (the second resource set) containing the same number of 5 CSI-RS resources in the second Resource Setting is linked with the same one 'CSI-ReportConfig'. Each CSI-RS resource within CSI-RS resource set #1 is one-by-one associated with the CSI-RS resource within CSI-RS resource set #2 with the same ordering. In particular, CSI-RS resource #1-1 is associated with CSI-RS resource #2-1, CSI-RS resource #1-2 is associated with CSI-RS resource #2-2, CSI-RS resource #1-3 is associated with CSI-RS resource #2-3, CSI-RS resource #1-4 is associated with CSI-RS resource #2-4, CSI-RS resource #1-5 is associated with CSI-RS resource #2-5.

When the transmission of CSI-RS resource sets is aperiodic, the UE is not expected to be configured with different aperiodic triggering offsets of the NZP CSI-RS between the two CSI-RS resource sets (i.e. first resource set and second resource set). In the present disclosure, aperiodic triggering offset is only configured for the first resource set, while the aperiodic triggering offset of the second resource set follows the aperiodic triggering offset of the first resource set.

In the example of FIG. 1, if the transmissions of CSI-RS resource set #1 and CSI-RS resource set #2 are aperiodic, they are configured with the same aperiodic TriggeringOffset value.

In the prior art, since one CSI reporting setting 'CSI-ReportConfig' is linked to CSI-RS resource set(s) of one Resource Setting for channel measurement that is related to one TRP, the UE reports the CSI parameters only for the one TRP.

In the present disclosure, one CSI reporting setting 'CSI-ReportConfig' is linked to CSI-RS resource sets of two Resource Settings for channel measurement that are related to two TRPs, the UE would report CSI parameters for the two TRPs.

Similar to the prior art, the CSI parameters to be reported depend on reportQuantity contained in the 'CSI-ReportConfig'. For example, when 'reportQuantity' in the 'CSI-ReportConfig' is set to 'cri-RI-LI-PMI-CQI', CRI, RI, PMI, LI and CQI for both the first resource set in the first Resource Setting that is related to the first TRP and the second resource set in the second Resource Setting that is related to the second TRP would be reported. That is, CRI #1, RI #1, PMI #1, LI #1 and CQI #1, and CRI #2, RI #2, PMI #2, LI #2 and CQI #2 are reported.

CSI parameters CRI #1, RI #1, PMI #1, LI #1 and CQI #1 (CSI #1) are obtained with respect to the first resource set that is related to TRP #1; and CSI parameters CRI #2, RI #2, PMI #2, LI #2 and CQI #2 (CSI #2) are obtained with respect to the second resource set that is related to TRP #2.

In calculating RI (RI #1 and RI #2), PMI (PMI #1 and PMI #2) and LI (LI #1 and LI #2), the QCL assumption is necessary to be considered.

According to the present disclosure, the 'QCL-TypeD' (i.e. spatial Rx parameter) is indicated by the higher layer parameter qcl-info configured for the NZP CSI-RS resource for channel measurement. It means that the UE receives the NZP CSI-RS resource for channel measurement using the spatial Rx parameter indicated by the higher layer parameter qcl-info.

In particular, the first set of CSI parameters, e.g., RI #1, PMI #1 and LI #1, are calculated based on the qcl-info configured for the selected CSI-RS resource in the first Resource Setting. The second set of CSI parameters, e.g., RI #2, PMI #2 and LI #2, are calculated based on the qcl-info configured for the selected CSI-RS resource in the second Resource Setting.

In Single-DCI based multi-TRP (e.g. two TRPs) DL transmission, the channel matrices from TRPs to a UE can be obtained by the UE and the inter-TRP interference can be eliminated at the UE side. Therefore, when calculating interference signal, the interference conducted by the associated NZP CSI-RS resources for channel measurement do not belong to the other interference to derive the CSI parameter.

Figure 2:
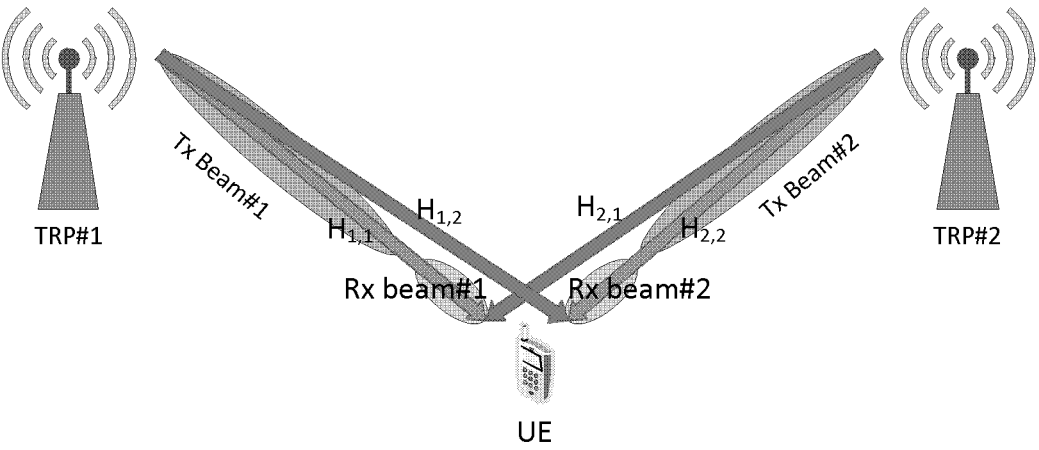
FIG. 2 illustrates channel and interference measurement in condition of multi-TRP (e.g. two TRPs)

As shown in FIG. 2, the gNB schedules a multi-TRP (two TRPs) PDSCH transmission based on the joint channel matrix $H=[H_{1,1}, H_{1,2}, H_{2,1}, H_{2,2}]$. $H_{1,1}$ represents the Tx beam #1 to be received by Rx beam #1 (i.e. the signal from TRP #1 to UE). $H_{2,2}$ represents the Tx beam #2 to be received by Rx beam #2 (i.e. the signal from TRP #2 to UE). On the other hand, $H_{1,2}$ represents the Tx Beam #1 that is received by Rx beam #2 (i.e. the interference from TRP #1 to the signal to be received from TRP #2); $H_{2,1}$ represents the Tx Beam #2 that is received by Rx beam #1 (i.e. the interference from TRP #2 to the signal to be received from TRP #1).

The inter-TRP (between TRP #1 and TRP #2) interference, i.e. CSI corresponding $H_{1,2}$ and $H_{2,1}$, can be estimated by the DM-RSs transmitted from TRP #1 and TRP #2 and can be cancelled at the UE side (e.g. by interference cancellation receiver). Therefore, when calculating CSI parameters by the UE, the interference conducted by the associated NZP CSI-RS resource for channel measurement (e.g. $H_{1,2}$ and $H_{2,1}$) should not be regarded as other interference signal on REs of NZP CSI-RS resource for channel measurement.

Take FIG. 1 as an example, suppose CSI-RS #1-3 in resource set #1 and its associated CSI-RS #2-3 in resource set #2 are indicated as CRI to be reported, when calculating CSI parameters for the resource set #1, e.g. RI #1, PMI #1, CQI #1 and LI #1, the interference from the beam of CSI-RS #2-3 is not included as other interference. Similarly, when calculating CSI parameters for the resource set #2, e.g. RI #2, PMI #2, CQI #2 and LI #2, the interference from the beam of CSI-RS #1-3 is not included as other interference.

After obtaining the CSI parameters for the first and the second resource sets (e.g. CSI #1 and CSI #2), they will be reported by the UE. CSI #1 and CSI #2 can be separately reported. For example, two sets of {CRI, RI, PMI, LI, CQI} may be reported for two resource sets.

Alternatively (preferably), a joint CSI report for the two resource sets is possible. That is, CSI #1 and CSI #2 can be jointly reported.

(1) CRI:

Because the CSI-RS resources in the first resource set is one-to-one associated with the CSI-RS resources in the second resource set, single CRI can be reported in a joint CSI report. As shown in FIG. 1, if CRI #1-3 is selected in CSI #1 (accordingly, CRI #2-3 is selected in CSI #2), it is only necessary to jointly report "CRI=3", which means both CRI #1-3 and CRI #2-3 are selected. The joint report of CRI may be reported with an index CRI k (k>=0). For example, CRI 2 may be used to represent "CRI=3". That is, CRI k (k>=0) corresponds to the configured $(k+1)^{th}$ CSI-RS resource in the first resource set in the first Resource Setting and the configured $(k+1)^{th}$ CSI-RS resource in the second resource set in the second Resource Setting.

(2) RI:

RI #1 is calculated based on the CSI-RS resource indicated by the first CRI (e.g. CRI #1-3); and RI #2 is calculated based on the CSI-RS resource indicated by the second CRI (e.g. CRI #2-3). In the prior art, when RI #1 and RI #2 are separately reported, each of RI #1 and RI #2 has a restriction by the higher layer parameter ri-Restriction, e.g. RI #1<<ri-Restriction, RI #2≤ri-Restriction. For example, when the higher layer parameter ri-Restriction is set to 4, each of RI #1 and RI #2 may take the values of any of 1, 2, 3 and 4. Accordingly, two bits are necessary for the report of RI #1 and other two bits are necessary for the report of RI #2. Therefore, four bits are necessary for the report of RI #1 and RI #2.

In the scenario of multi-TRP (e.g. two TRPs), RI #1 and RI #2 can be jointly reported. The higher layer parameter ri-Restriction may be re-interpreted as the restriction of the sum of RI #1 and RI #2 (i.e. RI #1+RI #2≤ri-Restriction). As there is an implied restriction that at least one layer is transmitted from each TRP (i.e. RI #1>=1 and RI #2>=1), the possible combination of values of RI #1 and RI #2 can only be "1 and 1", "1 and 2", "2 and 1", "2 and 2", "1 and 3", "3 and 1" if ri-Restriction is set to 4. Therefore, a joint RI can be reported based on Table 1.

TABLE 1

| Joint RI indication | |
| --- | --- |
| Joint RI indication value | RI values (RI#1, RI#2) |
| 0 | 1, 1 |
| 1 | 1, 2 |
| 2 | 2, 1 |
| 3 | 2, 2 |
| 4 | 1, 3 |
| 5 | 3, 1 |

It can be seen that, only three bits are needed for the report of joint RI (with only 6 possible values). Compared with separate report of RI #1 and RI #2, one bit can be saved.

(3) PMI

Two PMIs (PMI #1 and PMI #2) are separately reported regarding the channel measurement based on the first CSI-RS resource indicated by the first CRI (e.g. CRI1 #3) and the second CSI-RS resource indicated by the second CRI (e.g. CRI2 #3).

(4) LI

Two LIs are required to be reported, the first LI (LI #1) indicates which column of the precoder matrix of the first reported PMI (PMI #1) corresponds to the strongest layer, and the second LI (LI #2) indicates which column of the precoder matrix of the second reported PMI (PMI #2) corresponds to the strongest layer.

(5) CQI:

Only single codeword can be scheduled for single-DCI based multi-TRP non-coherent joint PDSCH transmission. It means that a single TB size and a single MCS can be used for the PDSCH transmission from multiple (e.g. two) TRPs. So, it is better for the UE to report a single joint CQI which is obtained according to CQI #1 that is calculated based on the first CSI-RS resource indicated by the first CRI (e.g. CRI1 #3) and CQI #2 that is calculated based on the second CSI-RS resource indicated by the second CRI (e.g. CRI2 #3).

As an example of joint CSI report, for a UE configured with CSI-ReportConfig with reportQuantity set to 'cri-RI-LI-PMI-CQI' is shown in the lower part of FIG. 1. The UE can report one CRI (e.g. CRI 2, i.e. "CRI=3", which means CRI #1-3 and CRI #2-3), one joint RI (e.g. one of values shown in Table 1, such as 2, 2), two PMIs (PMI #1 and PMI #2), two LIs (LI #1 and LI #2) and one CQI.

The above embodiment is described by example of aperiodic CSI reporting. In addition, the transmission of CSI-RS resources (CSI-RS resource set(s)) is also described as aperiodic. The present invention applies all types of CSI reporting, i.e. aperiodic, semi-persistent and periodic. In addition, the transmission of CSI-RS resources (CSI-RS resource set(s)) can also be any of aperiodic, semi-persistent and periodic. In particular, when the transmission of CSI-RS resources is periodic, the CSI reporting may be aperiodic, semi-persistent or periodic; when the transmission of CSI-RS resources is semi-persistent, the CSI reporting may be aperiodic or semi-persistent; and when the transmission of CSI-RS resources is aperiodic, the CSI reporting may be aperiodic. In any of the following conditions, one 'CSI-ReportConfig' can be configured with two Resource Settings for channel measurement. Accordingly, a joint CSI report may be transmitted from the UE to the gNB (base station).

The above embodiment is described by example of two TRPs. The present invention also applies to multiple TRPs (more than two TRPs). In condition of multiple TRPs (e.g. more than two TRPs), the same number as the number of TRPs of Resource Settings for channel measurement is configured for a UE for one CSI reporting setting 'CSI-ReportConfig'. That is, one CSI reporting setting 'CSI-ReportConfig' is linked to a plurality of Resource Settings for channel measurement, wherein the number of Resource Settings for channel measurement is the same as the number of TRPs. Each Resource Setting for channel measurement linked to the one CSI reporting setting 'CSI-ReportConfig' is related to a different TRP. All of the Resource Settings for channel measurement may have the same number of CSI-RS resources. Each CSI-RS resource in one of the Resource Settings for channel measurement has one associated CSI-RS resource in each of the other Resource Settings for channel measurement. It means that the associated CSI-RS resources are transmitted simultaneously from different TRPs with different beams.

Figure 3:
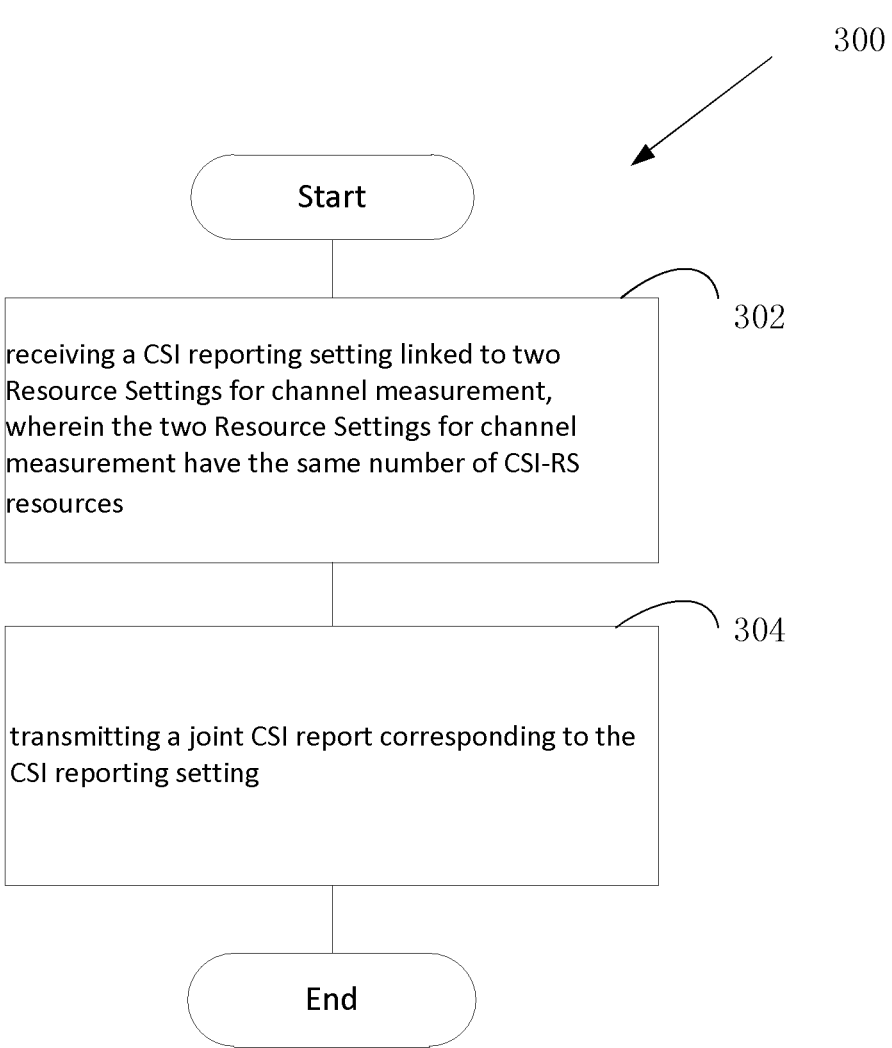
FIG. 3 is a schematic flow chart diagram illustrating an embodiment of a method.

FIG. 3 is a schematic flow chart diagram illustrating an embodiment of a method 300 according to the present application. In some embodiments, the method 300 is performed by an apparatus, such as a remote unit. In certain embodiments, the method 300 may be performed by a processor executing program code, for example, a micro-controller, a microprocessor, a CPU, a GPU, an auxiliary processing unit, a FPGA, or the like.

The method 300 may include 302 receiving a CSI reporting setting linked to two Resource Settings for channel measurement, wherein the two Resource Settings for channel measurement have the same number of CSI-RS resources; and 304 transmitting a joint CSI report corresponding to the CSI reporting setting.

Figure 4:
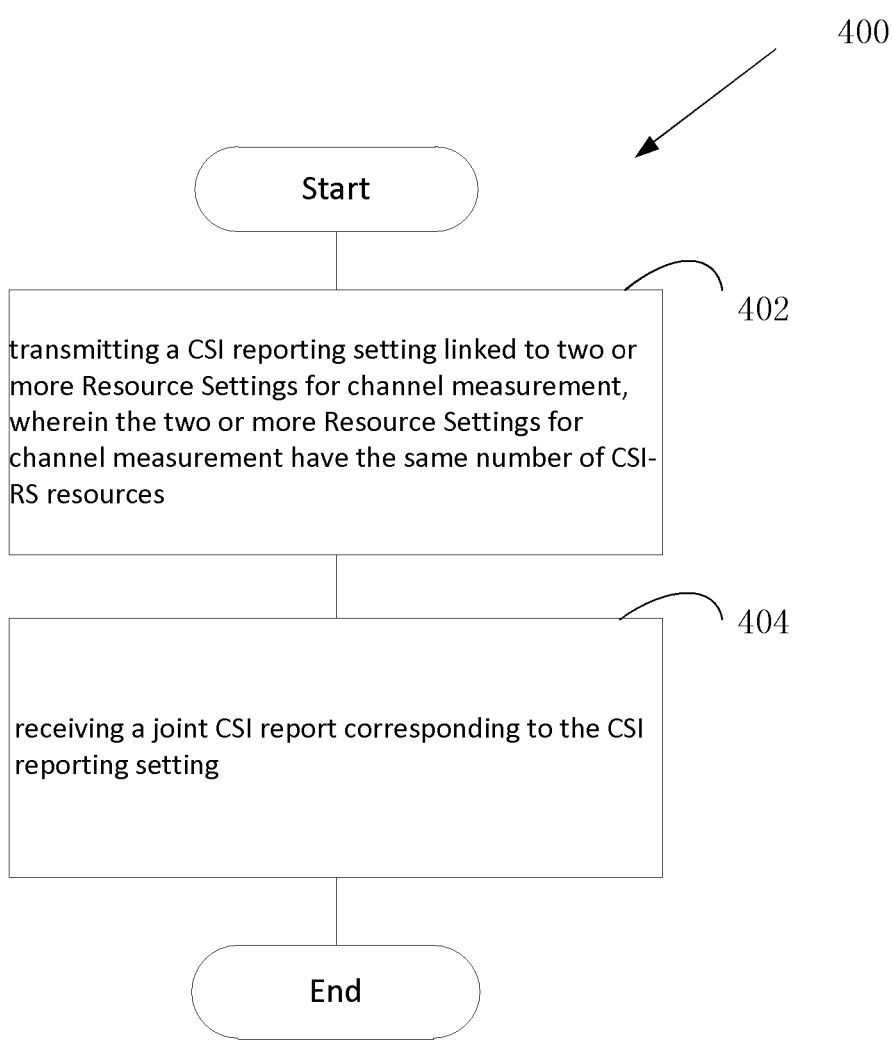
FIG. 4 is a schematic flow chart diagram illustrating a further embodiment of a method.

FIG. 4 is a schematic flow chart diagram illustrating an embodiment of a method 400 according to the present application. In some embodiments, the method 400 is performed by an apparatus, such as a base unit. In certain embodiments, the method 400 may be performed by a processor executing program code, for example, a micro-controller, a microprocessor, a CPU, a GPU, an auxiliary processing unit, a FPGA, or the like.

The method 400 may include 402 transmitting a CSI reporting setting linked to two or more Resource Settings for channel measurement, wherein the two or more Resource Settings for channel measurement have the same number of CSI-RS resources; and 404 receiving a joint CSI report corresponding to the CSI reporting setting.

Figure 5:
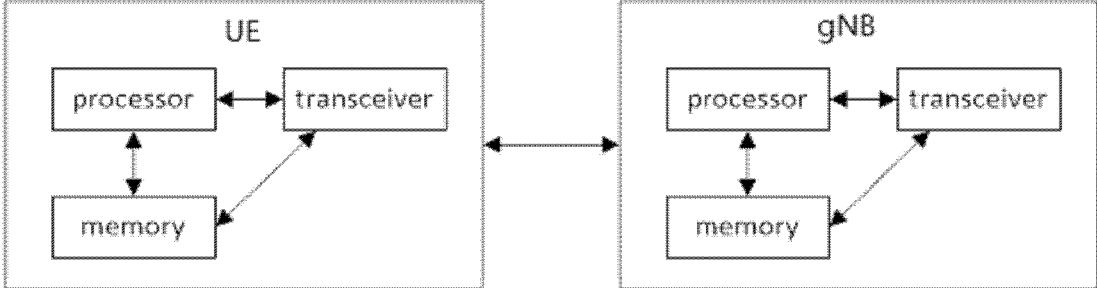
FIG. 5 is a schematic block diagram illustrating apparatuses according to one embodiment.

FIG. 5 is a schematic block diagram illustrating apparatuses according to one embodiment.

Referring to FIG. 5, the UE (i.e. the remote unit) includes a processor, a memory, and a transceiver. The processor implements a function, a process, and/or a method which are proposed in FIG. 3. The gNB (i.e. base unit) includes a processor, a memory, and a transceiver. The processors implement a function, a process, and/or a method which are proposed in FIG. 4. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base station, the method comprising:

transmitting a channel state information (CSI) reporting setting associated with two or more Resource Settings for channel measurement, wherein the two or more Resource Settings for channel measurement have the same number of CSI reference signal (CSI-RS) resources, and receiving a joint CSI report corresponding to the CSI reporting setting, wherein the joint CSI report includes a joint rank indicator (RI), two precoding matrix indicators (PMIs), two layer indicators (LIs) and one channel quality indicator (CQI), where each value of the joint RI indicates a RI combination with a value of $\{1, 1\}$, $\{1, 2\}$, $\{2, 1\}$, or $\{2, 2\}$, wherein the two Resource Settings for channel measurement includes a first Resource Setting and a second Resource Setting, each CSI-RS resource in the first Resource Setting is associated with a CSI-RS resource in the second Resource Setting, and wherein the joint CSI report includes one index CRI k ($k \geq 0$), wherein the CRI k corresponds to a configured $(k+1)^{th}$ CSI-RS resource in the first Resource Setting and the configured $(k+1)^{th}$ CSI-RS resource in the second Resource Setting.

2. The method of claim 1, wherein each value of the joint RI indicates RIs conducted by the CSI-RS resources indicated by a reported CRI.

3. The method of claim 2, wherein a sum of the RIs is smaller than or equal to a value indicated by a configured RI restriction in the CSI reporting setting.

4. A base station unit, comprising:

at least one memory; and at least one processor coupled with the at least one memory and configured to cause the base station to:

transmit a channel state information (CSI) reporting setting associated with two or more Resource Settings for channel measurement, wherein the two or more Resource Settings for channel measurement have the same number of CSI reference signal (CSI-RS) resources, and receive a joint CSI report corresponding to the CSI reporting setting, wherein the joint CSI report includes a joint rank indicator (RI), two precoding matrix indicators (PMIs), two layer indicators (LIs) and one channel quality indicator (CQI), where each value of the joint RI indicates a RI combination with a value of $\{1, 1\}$, $\{1, 2\}$, $\{2, 1\}$, or $\{2, 2\}$, wherein the two Resource Settings for channel measurement includes a first Resource Setting and a second Resource Setting, each CSI-RS resource in the first Resource Setting is associated with a CSI-RS resource in the second Resource Setting, and wherein the joint CSI report includes one index CRI k ($k \geq 0$), wherein the CRI k corresponds to a configured $(k+1)^{th}$ CSI-RS resource in the first Resource Setting and the configured $(k+1)^{th}$ CSI-RS resource in the second Resource Setting.

5. The base station of claim 4, wherein each value of the joint RI indicates RIs conducted by the CSI-RS resources indicated by a reported CRI.

6. The base station of claim 5, wherein a sum of the RIs is smaller than or equal to a value indicated by a configured RI restriction in the CSI reporting setting.

7. The base station of claim 4, wherein if a transmission of CSI-RS resources is aperiodic, the CSI-RS resources within the two or more Resource Settings are configured with the same triggering offset.

8. The base station of claim 4, wherein, the joint CSI report includes two or more LIs, a first LI indicates which column of a precoder matrix of a first reported PMI corresponds to a strongest layer and a second LI indicates which column of a precoder matrix of a second reported PMI corresponds to a strongest layer.

9. A user equipment (UE), comprising:

at least one memory; and at least one processor coupled with the at least one memory and configured to cause the UE to:

receive a channel state information (CSI) reporting setting associated with two Resource Settings for channel measurement, wherein the two Resource Settings for channel measurement have the same number of CSI reference signal (CSI-RS) resources, and transmit a joint CSI report corresponding to the CSI reporting setting, wherein the joint CSI report includes a joint rank indicator (RI), two precoding matrix indicators (PMIs), two layer indicators (LIs) and one channel quality indicator (CQI), where each value of the joint RI indicates a RI combination with a value of $\{1, 1\}$, $\{1, 2\}$, $\{2, 1\}$, or $\{2, 2\}$, wherein the two Resource Settings for channel measurement includes a first Resource Setting and a second Resource Setting, each CSI-RS resource in the first Resource Setting is associated with a CSI-RS resource in the second Resource Setting, and wherein the joint CSI report includes one index CRI k ($k \geq 0$), wherein the CRI k corresponds to a configured $(k+1)^{th}$ CSI-RS resource in the first Resource Setting and the configured $(k+1)^{th}$ CSI-RS resource in the second Resource Setting.

10. The UE of claim 9, wherein each value of the joint RI indicates RIs conducted by the CSI-RS resources indicated by a reported CRI.

11. The UE of claim 9, wherein a sum of the RIs is smaller than or equal to a value indicated by a configured RI restriction in the CSI reporting setting.

12. The UE of claim 9, wherein if a transmission of CSI-RS resources is aperiodic, the CSI-RS resources within two or more Resource Settings are configured with the same triggering offset.

13. The UE of claim 9, wherein, the joint CSI report includes two or more LIs, a first LI indicates which column of a precoder matrix of a first reported PMI corresponds to a strongest layer and a second LI indicates which column of a precoder matrix of a second reported PMI corresponds to the strongest layer.

14. The UE of claim 9, wherein, parameters of the joint CSI report are obtained by assuming interference, where the interference does not include interference conducted by associated CSI-RS resources among two or more Resource Settings for channel measurement.

15. A method performed by a user equipment (UE), the method comprising:

receiving a channel state information (CSI) reporting setting associated with two Resource Settings for channel measurement, wherein the two Resource Settings for channel measurement have the same number of CSI reference signal (CSI-RS) resources, and transmitting a joint CSI report corresponding to the CSI reporting setting, wherein the joint CSI report includes a joint rank indicator (RI), two precoding matrix indicators (PMIs), two layer indicators (LIs) and one channel quality indicator (CQI), where each value of the joint RI indicates a RI combination with a value of {1, 1}, {1, 2}, {2, 1}, or {2, 2}, wherein the two Resource Settings for channel measurement includes a first Resource Setting and a second Resource Setting, each CSI-RS resource in the first Resource Setting is associated with a CSI-RS resource in the second Resource Setting, and wherein the joint CSI report includes one index CRI k (k>=0), wherein the CRI k corresponds to a configured $(k+1)^{th}$ CSI-RS resource in the first Resource Setting and the configured $(k+1)^{th}$ CSI-RS resource in the second Resource Setting.

16. The method of claim 15, wherein each value of the joint RI indicates RIs conducted by the CSI-RS resources indicated by a reported CRI.

17. The method of claim 15, wherein a sum of the RIs is smaller than or equal to a value indicated by a configured RI restriction in the CSI reporting setting.

18. The method of claim 15, wherein if a transmission of CSI-RS resources is aperiodic, the CSI-RS resources within two or more Resource Settings are configured with the same triggering offset.

19. The method of claim 15, wherein, the joint CSI report includes two or more LIs, a first LI indicates which column of a precoder matrix of a first reported PMI corresponds to a strongest layer and a second LI indicates which column of a precoder matrix of a second reported PMI corresponds to the strongest layer.

20. The method of claim 15, wherein, parameters of the joint CSI report are obtained by assuming interference, where the interference does not include interference conducted by associated CSI-RS resources among two or more Resource Settings for channel measurement.

* * * * *